United States Patent [19]
Thaxton

[11] 3,730,548
[45] May 1, 1973

[54] VEHICLE AIR-SPRING
[75] Inventor: Ellis B. Thaxton, Arlington, Tex.
[73] Assignee: Ride-Rite Corp., Arlington, Tex.
[22] Filed: June 24, 1971
[21] Appl. No.: 156,189

[52] U.S. Cl.................................280/124 F, 267/31
[51] Int. Cl................................................B60g 11/46
[58] Field of Search.....................267/31, 32, 23, 24, 267/52; 280/124 F, 124 R

[56] References Cited

UNITED STATES PATENTS

| 3,617,072 | 2/1971 | Turner | 280/124 |
|---|---|---|---|
| 2,874,956 | 2/1959 | La Belle | 267/31 X |
| 3,133,745 | 5/1964 | Granning | 280/124 F X |

*Primary Examiner*—Philip Goodman
*Attorney*—Arthur E. Dowell, Jr. et al.

[57] ABSTRACT

An air-spring assembly for mounting in a vehicle as a part of the vehicle suspension and including a pressure-inflatable elastomeric body having rigid end plates by which it is mounted between a chassis member and an axle member of the vehicle, the upper end plate carrying an inverted U-bracket which bears against the bottom of the frame member which extends longitudinally of the vehicle and is clamped thereto by bolted straps, and the lower end plate carrying a saddle plate straddling and secured to the axle member which extends transversely of the vehicle.

3 Claims, 4 Drawing Figures

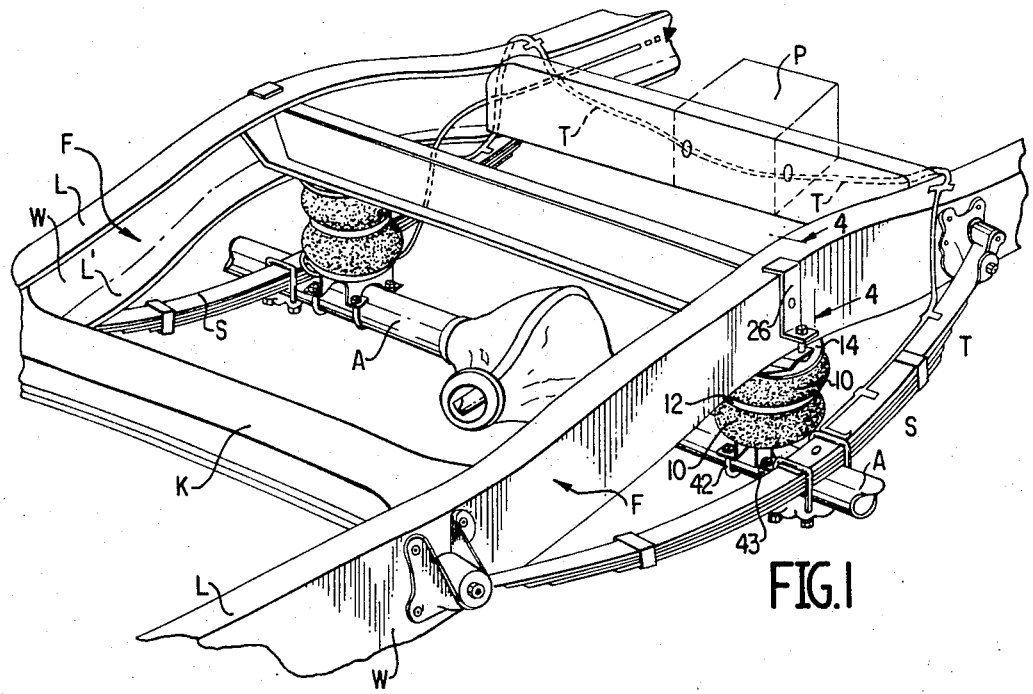
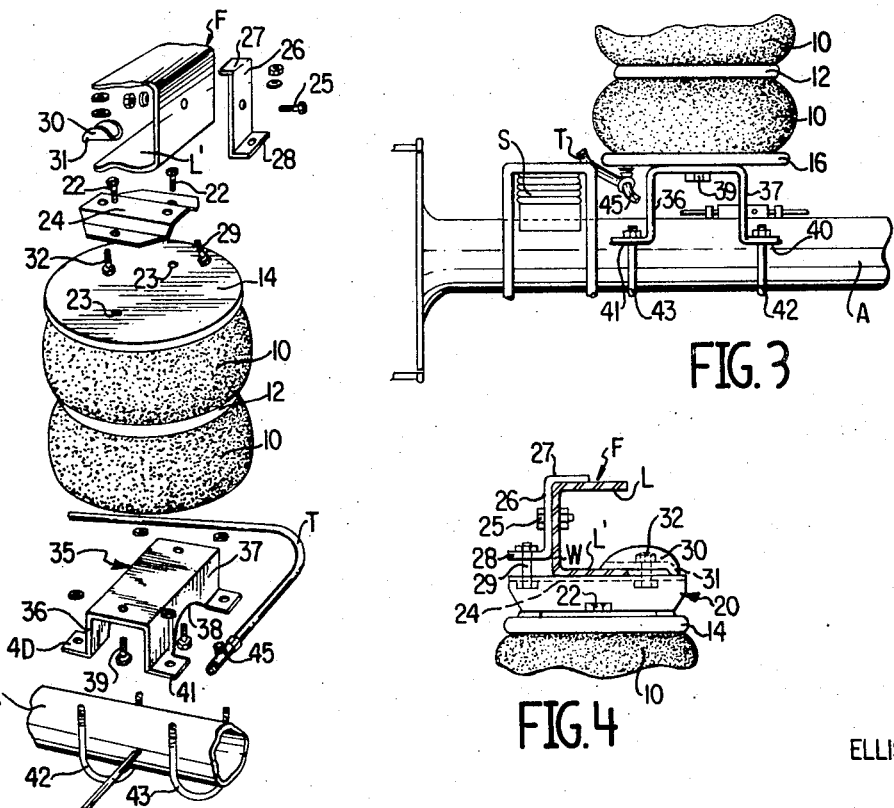
INVENTOR
ELLIS B. THAXTON
BY Alexander & Dowell
ATTORNEY

VEHICLE AIR-SPRING

This invention relates to an air spring assembly having mounting means adapted to secure an inflatable body between a frame member of a vehicle and an axle member thereof to resiliently support the latter on the former.

It is a principal object of this invention to provide an economical air-spring assembly especially useful as either a primary, or as an auxiliary, spring means for supporting and/or leveling a vehicle frame above an axle.

It is another object of the invention to provide air-spring mounting means which is secure against accidental displacement from its selected position on the vehicle frame and axle members.

It is a further object of the invention to provide an air-spring assembly which can be readily secured to existing frame and axle members using simple tools, and without interfering with already existing vehicle suspension means.

Other objects and advantages of the invention will become apparent during the following discussion of the drawing, wherein:

FIG. 1 is a perspective view showing air-spring assemblies according to the present invention mounted between chassis frame members and an axle member of a vehicle;

FIG. 2 is an exploded perspective view showing the vehicle members and the air-spring assembly parts somewhat enlarged as compared with FIG. 1;

FIG. 3 is a partial detail view showing in elevation the lower air-spring mounting means; and FIG. 4 is a partial view taken through the vehicle frame at line 4—4 in FIG. 1 and showing the upper mounting means for the air-spring.

Referring now to the drawing, FIG. 1 shows a partial view of a vehicle frame and spring suspension, the view including spaced channel frame members F each having two legs L and L' and a web portion W. The frame also includes cross braces K, one of which carries a source of pressure P which is connected with pressure tubing T and can include suitable valve and/or pressure meter means (not shown). The vehicle also includes an axle member A which in this particular illustration is an axle housing member, but which might also comprise a non-rotating axle supporting wheels at its outer end. The frame members F are supported on the axle member A by leaf springs S held in place on the axle by U-bolt means in the usual manner, and the leaf springs S being supported at their ends by suitable shackle members attached to the frame member F. In the present assembly, the frame member F is arched over the axle and the leaf springs S are located transversely outwardly with respect to the vehicle frame F, thereby leaving a space between the underside of the arched frame and the top of the axle A into which the present air-spring assembly can be mounted and secured. As many air-spring assemblies as desired can be used, FIG. 1 showing two such assemblies mounted immediately inside of the leaf springs S in symmetrical mutual relationship.

Each air-spring assembly includes an elastomeric body 10, in the present illustration including two adjacent convolutions cynched in at the center by a ring 12 in a manner which is well known in the air-spring art. The elastomeric body includes upper and lower mounting plates 14 and 16 respectively. These plates are secured to beads (not shown) around the upper and lower peripheries of the elastomeric body 10 in a manner which is well known in the prior art and requires no further discussion since it is not considered novel in the present disclosure.

The upper plate 14 has an inverted U-shaped bracket 20 overlying it and secured on the upper surface of the plate 14 by bolts 22 which are entered into tapped holes 23 in the plate 14. The U-bracket 20 has a central raised portion 24 having holes through it for a purpose hereinafter stated. The central portion 24 of the U-bracket 20 lies against the lower leg L', as can best be seen in FIG. 4, and the U-bracket 20 is secured to the frame member F by two clamping members comprising straps which respectively overlie two opposite legs L and L' of the channel frame member F and clamp the latter tightly against the upper surface of the U-bracket 20. These clamping members comprise a strap 26 which has a top lug 27 overlying the upper leg L of the frame channel, and also has a foot 28 which extends horizontally over the upper surface of the U-bracket 20 and is tightened thereto by the bolt 29 which passes through the raised portion 24 of the U-bracket and through the foot 28 of the strap 26. The strap 26 is preferably also bolted to the web W of the frame F by a bolt 25 which prevents slippage of the upper mounting means of the air-spring assembly longitudinally with respect to the frame member F. Another strap member comprises a lug 30 which overlies the lower leg L' of the channel member F and clamps it tightly against the surface of the raised portion 24 of the U-bracket 20. The lug 30 also has a foot 31 bent downwardly to contact the U-bracket 20 and support the lug 30 in the position shown in FIG. 4. A bolt 32 pulls the lug 30 tightly against the U-bracket 20 to complete the upper air-spring assembly mounting means.

The lower mounting means of the air-spring assembly comprises a saddle plate 35 having an upper surface secured against the lower plate 16 of the air-spring by bolts 39. The saddle plate also includes two downwardly extending flange members 36 and 37 which are cut out as can be seen for instance at 38 in FIG. 2 so as to overlie the upper surface of the axle member A and snugly engage it. Each of the flanges 36 and 37 has outwardly extending feet 40 and 41 adapted to receive the upper ends of U-bolts 42 and 43 by which the saddle plate 35 is attached to the axle A.

The tubing T is connected by suitable fittings 45 which are threaded into a hole through either the lower plate 16 or the upper plate 14 as desired for convenient mounting. In the present example, the tubing is shown in FIG. 1 as having been clamped to the inner edge of a leaf-spring S, although there are also advantages in entering the pressure into the upper plate 14 in view of the fact that it is not moveable during normal performance of the vehicle.

One feature of the present invention is that the clamping members 26 and 30, which mount the upper plate of the air-spring assembly, grip a frame member F which extends longitudinally of the vehicle, whereas conversely the U-bolts 42 and 43 which mount the lower plate of the assembly grip the axle member A which extends transversely of the vehicle. Thus, any tendency that the air-spring might have toward displacement at one end tends to be opposed by the fact that the mounting at the other end of the air-spring assembly could not be moved in a direction contributing to movement at the first end if the air-spring attempted to slip, for instance, if mounting bolts should loosen during use of the vehicle.

The present invention is not to be limited to the exact form shown in the drawings for obviously changes can be made within the scope of the following claims.

I claim:

1. An air-spring assembly for supporting a vehicle when pressurized from a pressure source said vehicle having longitudinally extending frame channel members arched over a transversely extending axle member and having leaf springs mounted transversely outwardly of the frame members and attached to the axle member outwardly of the frame members, said air spring assembly comprising pressure inflatable elastomeric bodies each oriented upright and each located directly under a frame member and directly above the axle member adjacent to a leaf spring and transversely inwardly therefrom; upper and lower end plates closing each body and respectively located near the adjacent channel member and near the axle member; upper mounting means for each upper end plate comprising an inverted U-bracket overlying the upper surface thereof and secured thereto and having a central bracket portion raised above the upper end plate and bearing against the lower surface of the adjacent channel member, and clamp means engaging opposite sides of the channel member and bolted to the raised portion of the U-bracket to secure the latter to the channel member; and lower mounting means comprising a saddle plate straddling the axle member transversely inwardly of the adjacent leaf spring and having a plate portion extending above the axle member and secured to the lower end plate of the inflatable body, and means securing the saddle plate to the axle member.

2. In an air-spring assembly as set forth in claim 1, said clamp means comprising straps respectively overlying opposite legs of said channel member, each strap including a lug bolted to the raised central portion of the U-bracket, and one strap being bolted to the web of the channel member to prevent longitudinal shifting with respect thereto.

3. In an air-spring assembly as set forth in claim 1, said saddle plate comprising two downwardly-extending flange portions depending from said plate portion and shaped to snugly fit over the top of said axle, and spaced U-bolt means underlying the bottom of the axle and secured to the saddle plate near the bottoms of said flange portions.

* * * * *